United States Patent [19]

Repholz et al.

[11] Patent Number: 4,954,061
[45] Date of Patent: Sep. 4, 1990

[54] MULTI-ORIFICE COEXTRUSION APPARATUS

[75] Inventors: Kenneth M. Repholz, Crystal Lake; Pradeep G. Kanade, Algonquin, both of Ill.

[73] Assignee: The Quaker Oats Company, Chicago, Ill.

[21] Appl. No.: 419,680

[22] Filed: Oct. 11, 1989

Related U.S. Application Data

[62] Division of Ser. No. 90,699, Aug. 28, 1987, Pat. No. 4,900,572.

[51] Int. Cl.$^5$ .................. B29C 47/06; A21C 11/16
[52] U.S. Cl. .................. 425/131.1; 99/450.6; 425/190; 425/308; 425/309; 425/463; 425/466
[58] Field of Search .................. 425/131.1, 133.1, 463, 425/131.5, 192 R, 463, 198, 466, 190; 264/142, 148, 143; 99/308, 309, 450.1, 450.6

[56] References Cited

U.S. PATENT DOCUMENTS

| | | | |
|---|---|---|---|
| 936,722 | 10/1909 | Howard | 425/133.1 |
| 3,227,103 | 1/1966 | Schafer | 425/463 |
| 3,370,553 | 2/1968 | Rich et al. | 425/131.1 |

FOREIGN PATENT DOCUMENTS 322603 8/1957 Switzerland .................. 425/131.1

*Primary Examiner*—Willard Hoag
*Attorney, Agent, or Firm*—St. Onge Stewart Johnston & Reens

[57] ABSTRACT

The present invention presents a dual-textured pet food as well as a multi-orifice coextrusion apparatus and method for the use of the multi-orifice coextrusion apparatus for preparing the dual-textured pet food of the invention. The multi-orifice coextrusion apparatus of the present invention feeds a first extruded material through a plurality of inner openings, and a second extruded material through a plurality of outer, annular openings, the inner openings and the annular openings converging to enable formation of a center-filled extrudate at a plurality of extrusion orifices. The present invention also presents a means of configuring the orifices to maintain substantially uniform distribution and volumetric flow of the second extruded material about the first extruded material across the cross section of the orifices.

20 Claims, 7 Drawing Sheets

MULTI-ORIFICE COEXTRUSION APPARATUS

This is a divisional of copending application Ser. No. 07/090,699 filed on 08/28/87 which is now U.S. Pat. No. 4,900,572.

TECHNICAL FIELD

The present invention relates to an apparatus for the coextrusion of materials to form center-filled products, particularly food products, such that an outer component is uniformly distributed about an inner component to form an extrudate which is sliced into thin, essentially flat segments showing both components in a substantially consistent pattern. The present invention also relates to a method for making center-filled products using the apparatus and to the products so made.

In forming a center-filled food, for instance a dual-textured, center-filled pet food product having a soft, meat-like component surrounded by a hard, crunchy component, the materials used to form the two components can be coextruded by extruding both components into a coextrusion manifold which allows the outer component to flow around a set of tubes through which the inner component flows. The outer component is then channeled through annuli formed by the tubes and a spacer plate having passages. The inner diameter of the passages in the spacer plate is larger than the outer diameter of the tubes to allow annuli formation between each tube and each passage. The outer component flows through the annuli and surrounds the inner component emerging from the tubes to form center-filled streams. These streams then flow through die holes.

It has been difficult in practice, however, to consistently produce a uniform center-filled product. The uniformity of production depends upon establishing and maintaining uniform conditions for a production run. Where the pieces are of relatively small size and are thin, it becomes necessary to employ a die plate with a plurality of openings. This, however, has exaggerated the problems of achieving uniformity, mainly because of the non-uniform flow rates of the product components. Pieces from different die openings often have different shapes and sizes because of such non-uniform flow rates and also because of different flow resistances across the respective coextrusion orifices. Moreover, individual pieces, instead of being flat, are often cupped or capped.

BACKGROUND ART

The palatability advantages of soft, meaty pet foods have long been known, as have the desirable teeth cleaning and storage characteristics of dry, crunchy pet foods. A combination of these two types of pet foods, it logically follows, would be highly advantageous in terms of palatability and teeth cleaning and storage characteristics, and would also provide cosmetic advantages.

Blends of hard and soft textured pet foods have been extensively produced and have achieved notable success. Exemplary of such blended pet foods are those disclosed by Bone et al. in U.S. Pat. No. 4,006,266 and Coffee et al. in U.S. Pat. No. 4,190,679, the disclosures of each of which are incorporated herein by reference. Each of these disclosures relates to the production of a blend of hard and soft textured pet food having both a soft, meaty component and a hard, crunchy component, i.e., two distinct components.

Coextrusion apparatus which can be used to coextrude center-filled foods are also known. Such apparatus generally comprise at least two extruders and a manifold which combines the product of the two extruders and forms the center-filled coextruded pet food. Such coextrusion apparatus are disclosed, for instance, by Schafer in U.S. Pat. No. 3,241,503, which discloses a coextrusion apparatus for forming a concentric pastry; Slaybaugh in U.S. Pat. No. 3,480,445, which discloses a coextrusion apparatus for making a composite puffed cereal product; and Vollink et al. in U.S. Pat. No. 3,499,766, which discloses a coextrusion apparatus for making a puffed multiphased cereal product comprising a soft inner portion enrobed by a dry hard pastry portion.

Hildebolt, in U.S. Pat. No. 3,916,029, teaches the production of a center-filled pet food comprising a proteinaceous inner matrix surrounded by a pastry shell, which is prepared by a coextrusion method. Hildebolt makes mention of the "substantially uniform thickness" of the pastry shell, but only peripherally and without a teaching as to how to achieve such uniform thickness.

The teachings of the prior art relate to the formation of dual textured products "one" at a time, using pilot plant or other low output production equipment. However, when higher outputs are desired for commercial production, multiple dies and orifices are required. The use of multiple orifices leads to differences in flow throughput and production of either slivers or thick products can occur.

None of these prior art teachings provides a means for correcting for such flow variations of either product component which can lead to products having a non-uniform distribution of outer component about inner component.

There remains a present need, therefore, for an apparatus, especially a multi-orifice apparatus, and method for coextruding a center-filled product which is capable of ensuring the substantially uniform distribution of outer component about inner component and products having such substantially uniform distribution.

DISCLOSURE OF INVENTION

The present invention is a unique, dual-textured pet food as well as a multi-orifice coextrusion apparatus and method for using it to produce such unique dual textured pet food. The multi-orifice coextrusion apparatus of the present invention feeds a first extruded material through a plurality of tubes, and a second extruded material through a plurality of annuli about the tubes, the tubes and annuli converging to enable formation of a center-filled extrudate at a plurality of extrusion orifices.

The apparatus of this invention generally comprises a first extruder capable of feeding a first extruded material into a manifold through a plurality of tubes, the plurality of tubes extending from the first extruder into the manifold; a second extruder capable of feeding a second extruded material into the manifold so as to flow around the plurality of tubes; the manifold; a first spacer plate; a die plate and a slicing means.

The manifold comprises a chamber into which the plurality of tubes extend and has a port for introduction of the second extruded material from the second extruder. The chamber comprises a substantially open area to permit the second extruded material to flow around the plurality of tubes. The first spacer plate is mounted at an end of the manifold and comprises a plurality of spacer passages each of which corresponds to each of the plurality of tubes. Each of the spacer passages has an inner diameter greater than the outer diameter of each of the plurality of tubes, and each of the plurality of tubes is disposed in one of the plurality of spacer passages so that an annulus is formed about a tube by each spacer passage/tube combination.

The annuli are each configured effectively to maintain essentially constant volumetric flow of the outer extrudate across the entire cross section of the extrusion orifice. Constant volumetric flow of the inner extrudate is maintained by the tubes and the length of the die openings, described in more detail below. This assures uniformity from orifice opening to orifice opening and within any single orifice opening.

The constant volumetric flow of both extrudates helps to enable the extrudate to be sliced or cut into essentially uniform pieces. Crowning or cupping of the pieces is controlled by the land length of the die plate. This aspect is further controlled by the land length of the die plates or die inserts utilized in the die plates) and the relatively low coefficient of friction of the die plate (or die inserts) and spacer plates used in the present invention, as will be discussed in more detail below.

The configuring of the annular opening discussed above can be accomplished by providing a plurality of sleeves having an inner diameter greater than the outer diameter of the tubes, each of which is inserted into each of the plurality of spacer passages about the tubes and each of which is rotatable within the spacer passages. Each of the sleeves comprises an annular insert having an entrance opening at an entrance end thereof and a discharge opening at a discharge end thereof. The annular inserts have an inner diameter which can either be constant or decreasing from entrance end to discharge end and circumferentially variable wall thickness at the entrance end.

In order to produce an extrudate having substantially uniform distribution of outer component about inner component, as described above, the sleeves are selected with respect to wall thickness, as will be described in more detail below, and rotated within the spacer passages until the flow of the second (outer) extruded material being discharged out of the spacer passages is substantially circumferentially uniform about the first (inner) extruded material.

Of course, it will be recognized that complete uniformity is not always desired because some studies have indicated that consumers may sometimes prefer a food having some variation from piece to piece. The majority of the sleeves can be rotated to achieve substantially uniform outer component distribution about inner component with the remainder rotated to provide desired variations.

According to the present invention, a second spacer plate can be used in place of the first spacer plate with sleeves, with the spacer passages in the second spacer plate configured to provide the desired uniformity of distribution. A preferred way to accomplish this is to use a first spacer plate, select and insert the appropriate size of sleeves into the spacer passages of the first spacer plate, rotate the sleeves until the desired flow distribution is achieved, remove the first spacer plate with sleeves and machine or mill the spacer passages of the second spacer plate to duplicate the configuration of the spacer passages of the first spacer plate having the selected and rotated sleeves therein, and replacing the second spacer plate into the apparatus.

The present invention also relates to a method for making a center-filled food product having uniform peripheral distribution of the outer component about the inner component. The method comprises providing a plurality of tubes through which may flow a first extruded material; providing a manifold into which the plurality of tubes extends, the manifold comprising a chamber into which the plurality of tubes extend and having a port for introduction of a second extruded material. The manifold chamber comprises a substantially open area to allow a second extruded material to flow around the plurality of tubes.

The method of this invention further comprises providing a first spacer plate which is mounted on the manifold and which comprises a plurality of spacer passages each of which corresponds to the plurality of tubes, each of the spacer passages having an inner diameter greater than the outer diameter of each of the plurality of tubes. Each of the plurality of tubes is disposed in one of the plurality of spacer passages wherein a spacer annulus is formed by each spacer passage/tube combination. Also provided is a plurality of sleeves each comprising an annular insert having an entrance opening at an entrance end thereof and a discharge opening at a discharge end thereof, the sleeves having an inner diameter which may be decreasing or may be uniform from entrance end to discharge end and circumferentially variable wall thickness. The sleeves also have an inner diameter greater than the outer diameter of the tubes. Each of the sleeves is inserted into each of the plurality of spacer passages about the tubes so that it can be rotated.

The method also comprises extruding a first extruded material by a first extruding means through the plurality of tubes to discharge at or near the discharge end of the spacer passages of the first spacer plate; extruding a second extruded material by a second extruding means through the manifold port so as to flow about the plurality of tubes in the chamber of the manifold and the spacer annuli to discharge out of the spacer passages of the first spacer plate coaxial with and about the first extruded material; selecting and rotating each of the plurality of sleeves until the flow of the second extruded material being discharged out of the spacer passages is peripherally uniform about the first extruded material.

Furthermore, the apparatus and method of the present invention can further comprise a die plate, which can have die inserts associated therewith, through which the center-filled streams are discharged after being discharged from the first or second spacer plates; a third spacer which is mounted between the first or second spacer plates and the die plate and which functions to streamline the center-filled stream and provide sufficient time for the components to adhere to each other; and a slicing means which slices the center-filled streams into individual product pieces.

A further aspect of the present invention, as discussed above, also contemplates providing a second spacer plate having spacer passages which conform in inner diameter and internal shape to the inner diameter and internal shape of the sleeves; and replacing the first spacer plate and sleeves with the second spacer plate.

Another aspect of the present invention is the center-filled pet food having substantially uniform distribution of its outer component about its inner component prepared by the method and using the apparatus of the present invention.

BRIEF DESCRIPTION OF THE DRAWINGS

The present invention will be better understood and its advantages more apparent in view of the following detailed description, especially when read with reference to the appended drawings, wherein.

BEST MODE FOR CARRYING OUT THE INVENTION

Figure 1:
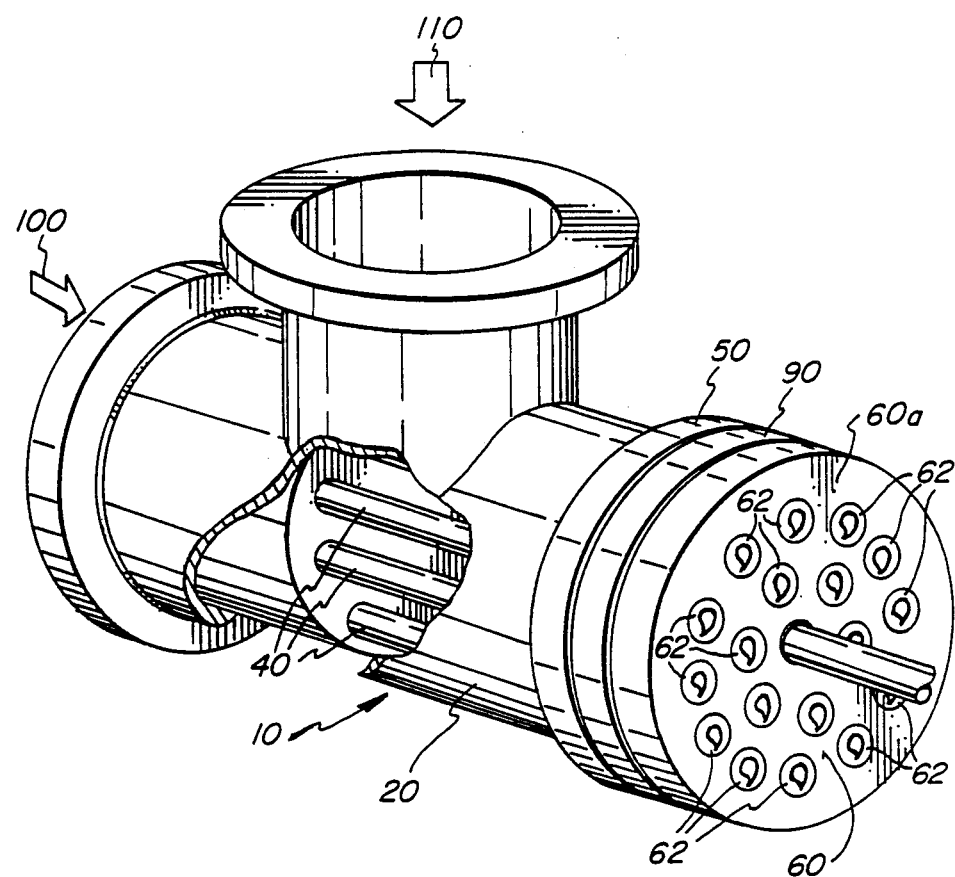
FIG. 1 is an isometric, partially broken-away view of a multi-orifice coextrusion apparatus of the present invention.

Referring to the drawings, a multi-orifice coextrusion apparatus, in accordance with the invention is generally indicated by the reference numeral 10. It should be noted that for the sake of clarity all the components and parts of multi-orifice coextrusion apparatus 10 are not shown and/or marked in all the drawings. As used in this description, the terms "up", "down", "top", "bottom", etc. refer to apparatus 10 when in the orientation illustrated in FIG. 1, although it will be recognized that apparatus 10 may be in any of various orientations when in use, the orientation illustrated in FIG. 1 not being necessary for operability. Furthermore, as used in this description, the terms "front" and "back" also refer to apparatus 10 when in the orientation illustrated in FIG. 1, with "front" indicating the end of apparatus 10 furthest to the right in FIG. 1 and "back" indicating the end of apparatus 10 furthest to the left in FIG. 1.

The use of the term "center-filled pet food" in this description is intended to refer to a pet food having two visually distinct regions. The regions comprise a central or inner region which is surrounded along at least a portion, and preferably all, of its cross-sectional perimeter by an outer region. Generally, in a center-filled pet food, it is preferred that the central or inner region comprise about 10% to about 90% of the food product. By "dual-textured" pet food is meant that the two visually distinct regions are also texturally distinct, typically one being soft and the other being hard, as discussed in more detail below. Other examples of "dual texture" include those wherein one of the components is smooth and shiny and the other is rough and dull.

Although the present invention is described in terms of the production of a dual-textured, center-filled pet food product, it will be recognized by the skilled artisan that the methods and apparatus described are equally applicable to a center-filled dual-colored pet food having a single texture (such as a dual-colored product having inner and outer portions which are both soft and moist or hard and dry) or a center-filled dual-textured pet food having a single color, and to a food product which is not intended for pets. Moreover, the apparatus of the present invention can also easily be used for the production of non-food center-filled products. The key criteria for the products produced according to this invention is in the production of a product having two components which adhere together as a visually and/or texturally unique product.

It is generally desired in the production of a pet food, to make the pet food nutritionally complete for the pet. It is also generally desired to provide a pet food which is highly palatable to the pet because no matter how nutritional it is, if the pet does not consume the appropriate amount, it will not receive the proper level of nutrients. Such nitritional and palatability characteristics are typically provided by making the pet food with proteinaceous ingredients, vitamins, minerals, carbohydrates and flavor enhancers such as fats and sweeteners. Of course it will be recognized that some ingredients perform more than one function, i.e., sugar can be used to provide sweetening and also reduce the water activity ($A_w$) of the product.

Figure 12:
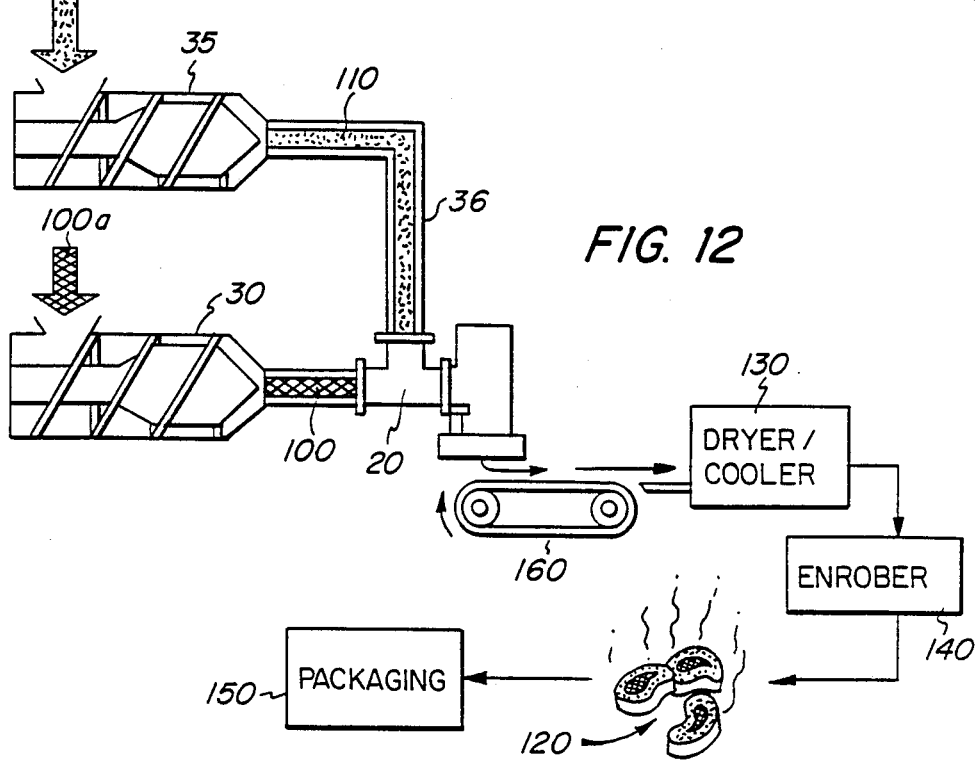
FIG. 12 is a schematic representation of the production of center-filled food products using the method of the present invention.

As illustrated in FIG. 12, the inner component 100 of the center-filled food product 120 typically represents the meat portion of the product being mimicked and generally is used to supply the majority of proteinaceous ingredients. For instance, if the product which is being mimicked is a meat chop such as a porkchop, the inner component of center-filled food product 120 should be a reddish or "brick" color to simulate the meat portion of the chop. Additionally, if center-filled food product 120 is intended to have dual-texture, inner component 100 generally has a soft texture. Conversely, outer component 110 of center-filled food product 120 typically represents the bone portion of the product being mimicked. It should, therefore, have a white or off-white color. In a dual-texture product, where inner component 100 has a soft texture, outer component 110 has a hard texture (of course, it will be recognized that both components have a relatively soft texture upon extrusion, with the desired textural distinctness occurring after water transport and equilibration between the two components).

Other examples of center-filled coextruded products which can be produced by this invention include a "meat-bone" product which comprises a hard, off-white, bone-like piece surrounded by a red, soft, meat-like portion, and a "T-bone" product in which a hard, off-white, bone-like component in a "T" shape is partially surrounded by a soft, red, meat-like portion. Other products which can be mimicked by the practice of this invention will be apparent to the skilled artisan.

Although the degree of hardness or softness of the outer and inner components respectively is a matter of preference, preferably, the soft, inner component should be soft enough to provide the palatability advantages recognized by the art in a soft pet food. Similarly, the hard, outer component should be sufficiently hard to satisfy the desires of pets, such as dogs, to chew and also provide the chewing action recognized as desirable for proper oral health.

In a typical dual-textured food product, such as a dual-textured pet food, the hardness of the hard component, and softness of the soft component, can be measured on an Instron brand load-measuring system by advancing the conical end of a one inch long, one-eighth inch diameter pin into the respective components at a velocity of two centimeters per minute. The results are measured in kilograms of force required for the conical end of the pin to penetrate through or break the component. Of course, it will be recognized that any other conventional method for measuring hardness and softness, such as those disclosed by Coffee et al., in U.S. Pat. No. 4,190,679, can likewise be utilized, especially since it is the relative hardness and softness of the outer and inner components, respectively, which is mainly of interest. Generally in a dual-textured pet food, the relative hardness of the hard, outer component (after equilibration) should be about 3.0 to about 30.0 kilograms, preferably about 4.0 to about 15.0 kilograms, while the relative hardness of the inner, soft component should be about 0.5 to about 3.0 kilograms, preferably about 1.0 to about 2.0, when measured as described above.

It will be recognized that dual-textured pet foods are known in the art (see, for instance, U.S. Pat. No. 4,006,266 to Bone et al.), and the relative hardness of the textures is widely variable and within the discretion of the practitioner. The values given above are provided by way of example and suggestion alone, and as such are not limiting.

As described above, the present invention utilizes two distinct pet food components that can differ in color, texture or appearance. Both components can be comprised of a wide variety of pet food ingredients, which are generally conventional in the art. Such ingredients may include amylaceous material from cereal grains and starches, fats, sugars, solutes, meat and meat byproducts, proteinaceous materials from vegetable and animal sources, vitamins, minerals and other known nutritional supplements, colorings, flavorings, plasticizers, humectants and preservatives. By the practice of the present invention, though, sticky caseinate binders are not required to bind the two coextruded components together.

Soft, inner component 100 of center-filled pet food 120 of this invention may advantageously comprise a combination of any of the following ingredients: a carbohydrate such as sugar or a starchy material, an animal protein source, a vegetable protein source, fat, water and a plasticizing (or softening) agent. Soft, inner component 100 contains solutes, humectants and salts in sufficient amount to maintain a low water activity compared to hard, outer component 110 in order to "pull" moisture out of outer component 110 to maintain the softness of inner component 100 and the hardness of outer component 110. Other ingredients which may also be included in soft, inner component 100 of center-filled pet food 120 include vitamins, minerals, coloring agents, natural and artificial flavors, stabilizers and preservatives and other known supplements, as would be familiar to the skilled practitioner.

Although the relative presence, or the use at all, of these ingredients is considered to be within the discretion of one skilled in the art, typically soft, inner component 100 should comprise up to about 30% by weight of sugar, up to about 25% by weight of animal protein source, up to about 40% by weight of vegetable protein source, up to about 15% by weight of fat and about 1% to about 20% by weight of plasticizing agent.

The term "sugar" as used herein is meant to include those sugars listed in U.S. Pat. No. 3,202,514 to Burgess et al., the disclosure of which is incorporated herein by reference, and specifically includes reducing and non-reducing water-soluble mono-saccharides and di-saccharides and reducing and non-reducing polysaccharides and their degradation products such as pentoses, including aldopentoses, methylpentoses, ketopentoses like xylose and arabinose, deoxyaldose like rhamnose, hexoses and reducing saccharides including aldo hexoses like glucose, galactose and mannose, ketohexoses like fructose and sorbose, disaccharides including lactose and maltose, non-reducing disaccharides including sucrose, and other polysaccharides like dextrin and raffinose, and hydrolyzed starches which include oligosaccharides.

The term "vegetable protein source" as used herein is meant to include those vegetable ingredients which normally contain at least about 20% protein by weight. Exemplary are soybean flour, soybean oil meal, soy protein concentrate, soy protein isolates, cottonseed meal, cottonseed flour, cottonseed protein isolates, cottonseed protein concentrates, peanut meal, peanut flour, peanut protein isolates, peanut protein concentrates, corn germ, corn germ meal, wheat germ, wheat germ meal, wheat gluten, corn gluten meal, corn gluten feed, and any other edible proteinaceous vegetable foodstuff.

Humectants which are suitable for use in the present invention include propylene glycol, glycerol and 1,3-butanediol, as well as others which will be familiar to the skilled artisan.

Advantageously, hard, outer component 110 of dual-texture center-filled pet food product 120 of this invention may comprise a combination of any of the following ingredients: a vegetable protein source, amylaceous ingredients such as cereal grains or starch, fats, water and an animal protein source. The use of salts, solutes and other water activity lowering ingredients is kept to a minimum, if they are used at all, in order to insure the transport of water from outer component 110 to inner component 100, as discussed above. Other ingredients which may also be included in hard, outer component 110 of center-filled pet food 120 include vitamins, minerals, coloring agents, natural and artificial flavors, stabilizers, preservatives and other known supplements, as would be familiar to the skilled practitioner.

Although the relative presence, or the use at all, of these ingredients is considered to be within the discretion of one skilled in the art, typically, hard, outer component 110 should comprise about 10% by weight to about 30% by weight of vegetable protein source, about 20% by weight to about 60% by weight of amylaceous ingredients, about 5% by weight to about 15% by weight fat and up to about 25% by weight of animal protein source. Fat and/or water are sometimes included in hard, outer component 110 as processing aids.

The use of the term "amylaceous ingredients" is meant to include those foodstuffs having a preponderance of starch and/or starch-like material. Such amylaceous ingredients include cereal grains and the flours or meals obtained from grinding cereal grains like wheat, corn, oats, barley and rice. Also included are tuberous foodstuffs such as potatoes, tapioca and the like as well as modified starches.

The ingredients 100a which comprise inner component 100 are subjected to heat and pressure and have water added to them (which is later partially dried in a drying step) in a conventional manner, such as in an extruder 30, illustrated in FIGS. 2 and 12, to form inner component 100. Exemplary of extruders suitable for use as extruder 30 are those extruders known in the art, such as those commercially available as the Wenger model X-200 extruder and the Wenger model X-175 extruder available from Wenger Manufacturing Company of Sabetha, Kans. Other suitable extruders include single screw extruders commercially available from Bonnot Company of Kent, Ohio; Anderson Company of Cleveland, Ohio; and Sprout-Waldron Company of Muncy, Pa. Suitable twin screw extruders include those commercially available from Wenger Manufacturing Company of Sabetha, Kans.; Baker Perkins Company of Saginaw, Mich.; and Werner & Pfleiderer of Ramsey, N.J.

Figure 2:
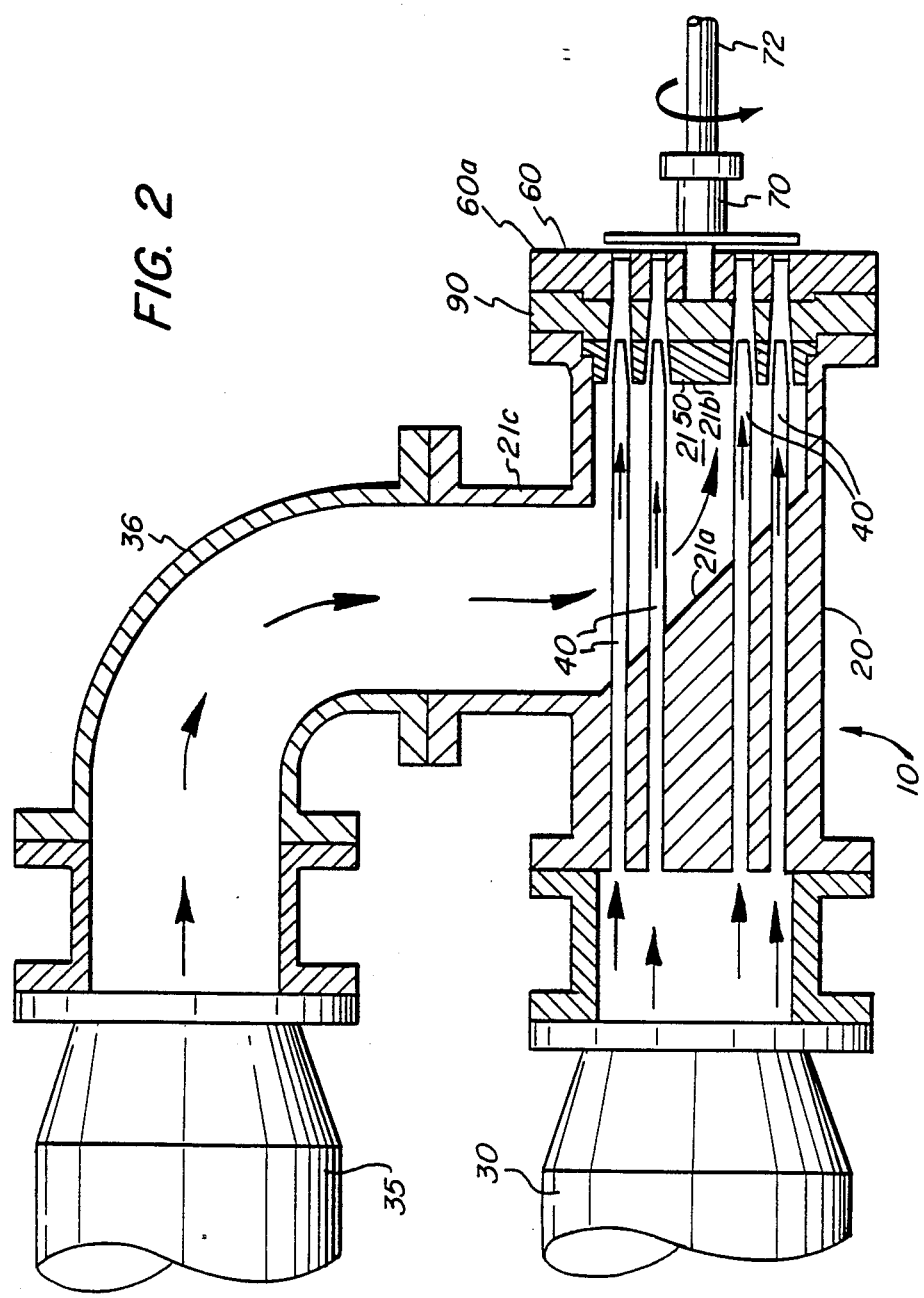
FIG. 2 is a schematic representation of a coextrusion process according to the present invention.

Inner component 100 is extruded as a first extruded material from extruder 30 and flows through a plurality of tubes 40 into a manifold 20, as illustrated in FIG. 2. It will be recognized that tubes 40 can be of any material suitable for the transport of extruded material and the heat and pressure conditions which extrusion entails, yet also provide the sanitary conditions considered necessary for materials which contact foodstuffs. Preferably, tubes 40 are composed of a metal, such as stainless steel. Most preferably, the stainless steel used to form tubes 40 is coated with a polytetrafluoroethylene material, such as Teflon brand material, or other suitable plastic, which lowers the coefficient of friction of tubes 40 to facilitate the flow of inner component 100.

Similarly, the ingredients 110a which comprise outer component 110 are subjected to heat and pressure and have water added (and dried away) in a traditional manner to form outer component 110 and then extruded as a second extruded material from conventional extruder 35, illustrated in FIGS. 2 and 12. The extruded outer component 110 also flows from extruder 35 into manifold 20 through a suitable conduit 36.

As illustrated in FIG. 1, manifold 20, made of any suitable material and preferably metal such as stainless steel, comprises a chamber 21 which is an open area in manifold 20 through which the plurality of tubes 40 extend. Tubes 40 enter chamber 21 at a proximal end 21a thereof and continue through chamber 21 to exit at a distal end 21b thereof. Chamber 21 also has a port 21c, as illustrated in FIG. 9, for introduction of the second extruded material, which comprises outer component 110, so that, by virtue of the fact that chamber 21 is an open area, the second extruded material flows around the plurality of tubes 40.

Figure 3:
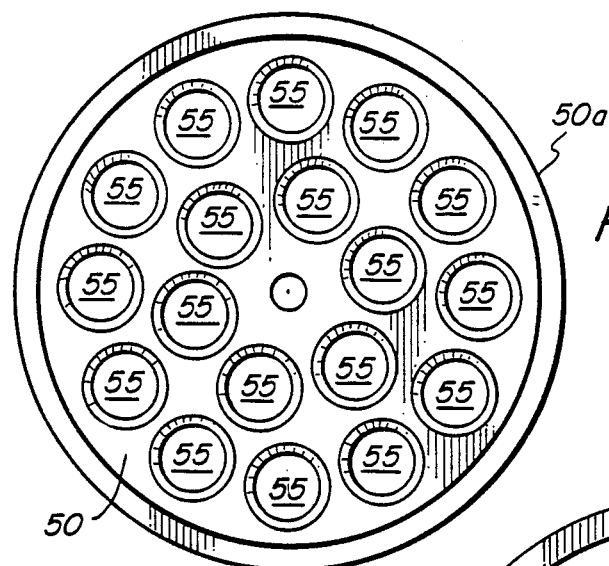
FIG. 3 is a back plan view of the first spacer plate of the present invention.
Figure 4:
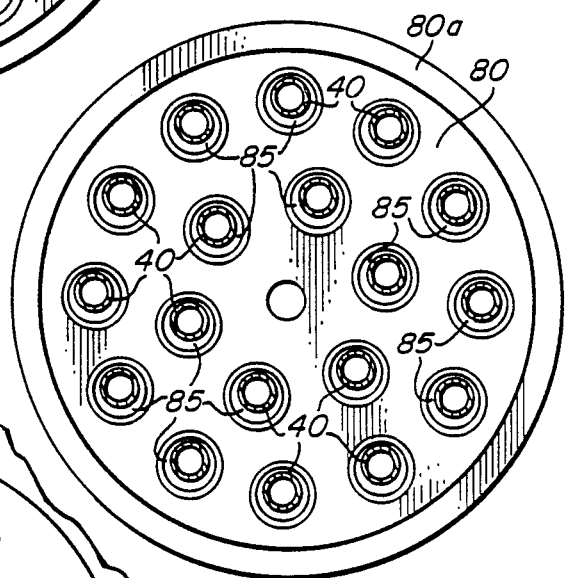
FIG. 4 is a plan view in cross section of the apparatus of the present invention taken along lines 4—4.
Figure 5:
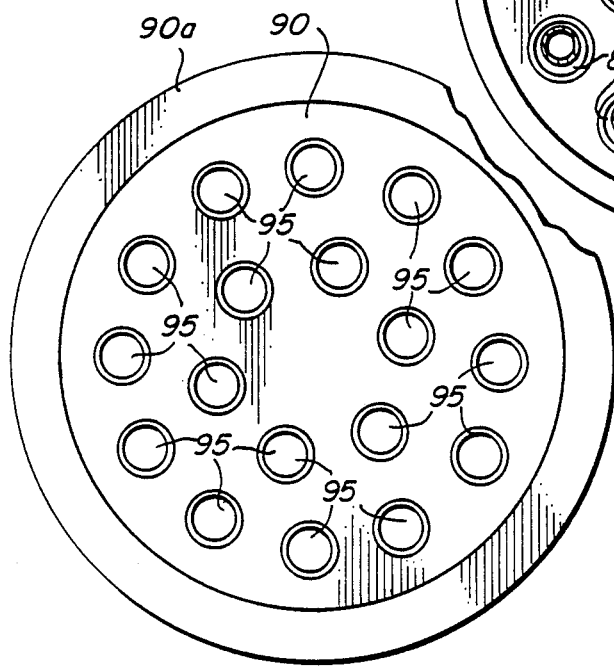
FIG. 5 is a back plan view of the third spacer plate of the present invention.
Figure 9:
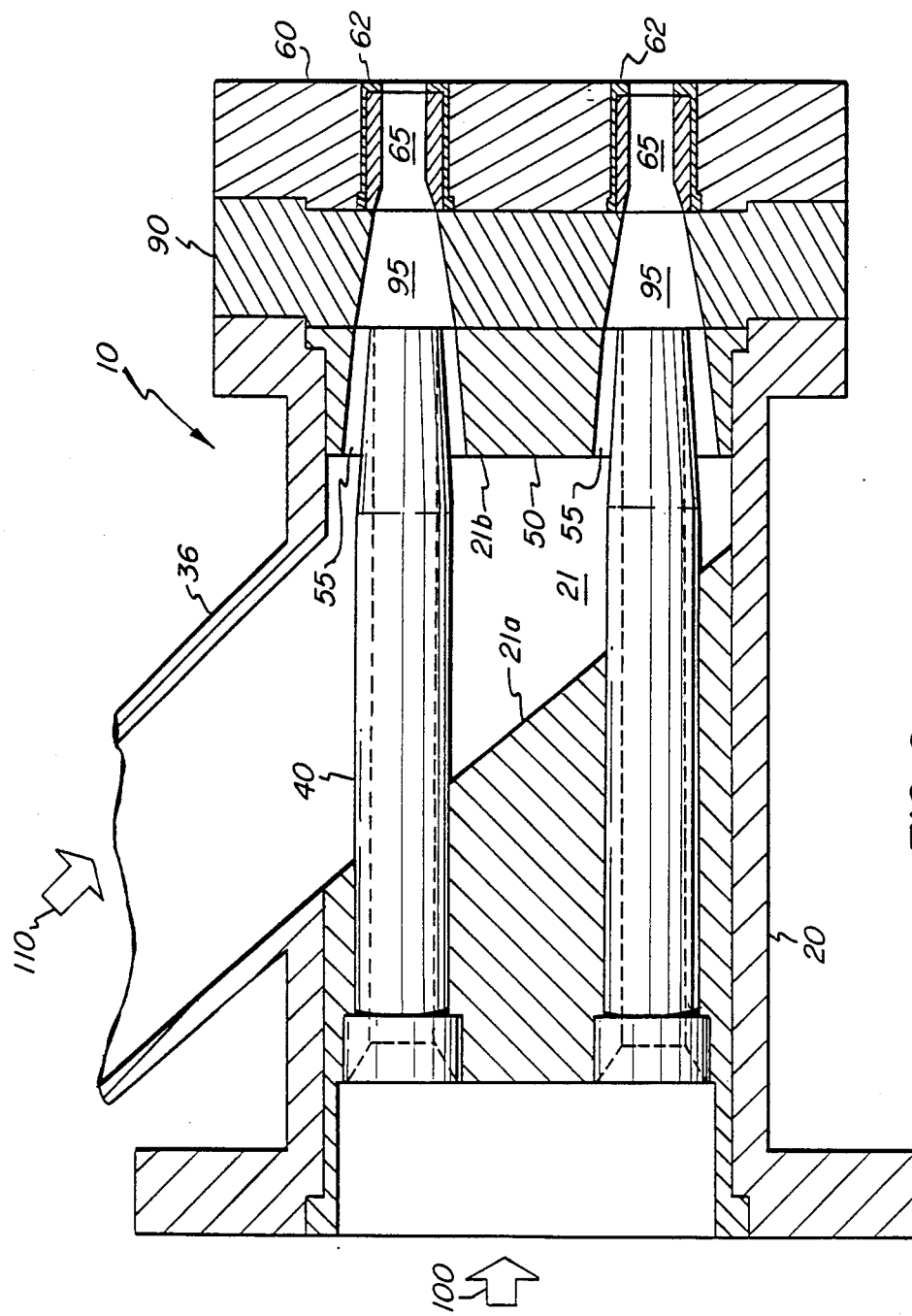
FIG. 9 is a side plan view in cross section of a multi-orifice coextrusion apparatus of the present invention having the first and third spacer plates and the die plate with die inserts present therein.

Removably mounted at distal end 21b of chamber 21 of manifold 20 is a first spacer plate 50, illustrated in FIG. 9, comprising a plurality of spacer passages 55 therethrough, as illustrated in FIG. 3. Spacer passages 55 are annular openings which extend through first spacer plate 50. Each of the plurality of spacer passages 55 corresponds to one of the plurality of tubes 40 and, moreover, the inner diameter of spacer passages 55 is greater than the outer diameter of tubes 40, so that each of tubes 40 extend into a spacer passage 55 from chamber 21 at its distal end 21b, thereby forming an outer annular opening about an inner opening (of course it will be recognized that there is no requirement for either the tubes 40 or the inner opening to be circular in nature, but it is preferred that they are circular because it is easist to machine and most flexible to use) between each of tubes 40 and spacer passages 55, as illustrated in FIG. 9.

Preferably, spacer passages 55 of first spacer plate 50 are of sufficient length along the axis of extrusion to promote flow stability along their length based on the viscosity of the material flowing through it, as would be familiar to the skilled practitioner. An appropriate length of spacer passages 55 to achieve flow stability of the food product components flowing therethrough is about 1.0 inches to about 4.0 inches, most preferably about 1.5 inches to about 2.5 inches, when extruding the compositions and under the conditions set forth in the Example.

Advantageously in the practice of this invention, the first extruded material being fed from the inner circular opening defined by the discharge end of tubes 40 converges with the second extruded material being fed through the annuli or the outer annular openings in spacer passages 55 or, most preferably, coterminus with the discharge end of spacer passages 55, as illustrated in FIG. 9, to enable the formation of a center-filled extrudate at the discharge ends or extrusion orifices of spacer passages 55.

First spacer plate 50 can be made of any material providing the required structural integrity and sanitary characteristics, such as a metal like stainless steel, preferably stainless steel covered with a thermoplastic, coefficient of friction-reducing material such as polytetrafluoroethylene. Other characteristics which should be present in the material selected to form first spacer plate 50 include thermal stability and corrosion resistance, and approval from the United States Food & Drug Administration or other such agency for contact with food products is also highly beneficial.

Advantageously, because of their low weight and ease of fabrication, spacer plate 50 is formed of a thermoplastic material having the desired strength and sanitary characteristics. The advantages derived from the use of a thermoplastic material are due to the relatively low coefficient of friction between the thermoplastic material and component 110 of center-filled food product 120 which is flowing through the annuli formed between tubes 40 and spacer passages 55 as compared to the coefficient of friction between a metal and food product component 110. Such low coefficient of friction facilitates the flow of food component 110 through first spacer plate 50. Preferably, the coefficient of friction of the material used to coat first spacer plate 50 or to form first spacer plate 50 is less than about 0.3, more preferably less than about 0.2. Most preferably, the coefficient of friction of such material is about 0.1 or even less. For instance, Teflon brand polytetrafluoroethylene has a coefficient of friction which has been measured to be in the range of 0.04 to 0.10. Stainless steel, as a comparison, has a coefficient of friction of about 0.3 to 0.4. These coefficient of friction values are obtained by using American Society of Testing and Materials (A.S.T.M.) method number D-628.

Exemplary of materials suitable for use in forming first spacer plate 50 (or of coating first spacer plate 50 if made of a high coefficient of friction material such as a metal) are thermoplastic materials such as polyvinylidene fluoride, polyacetal, polyethylene, polypropylene, polycarbonate, polyetherimide, polysulfone, polyethersulfone and polytetrafluoroethylene, as well as blends thereof, all of which are commercially available.

Figure 10:
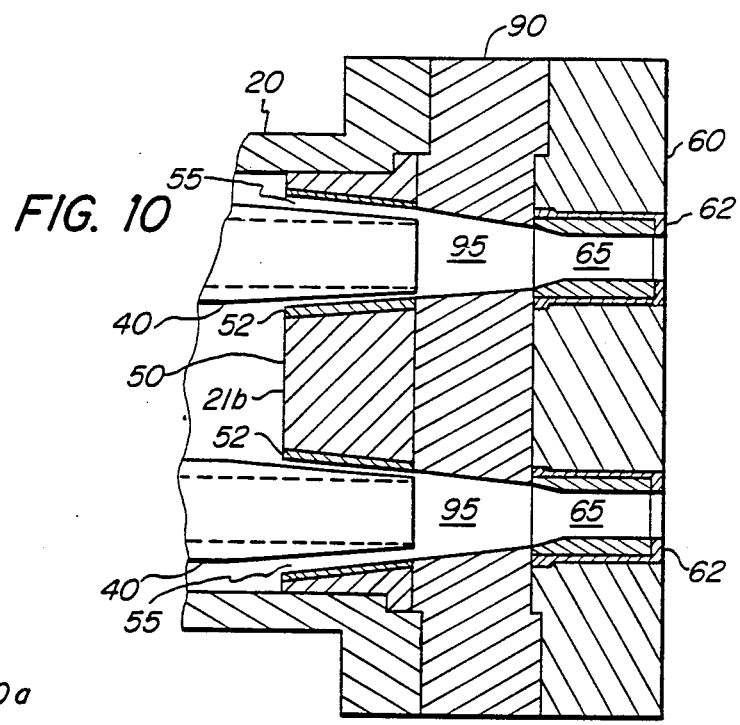
FIG. 10 is a side plan view in cross section of the multi-orifice coextrusion apparatus of the present invention having the first spacer plate with sleeves inserted and the die plate with die inserts therein.

As illustrated in FIG. 10 and discussed above, this invention further comprises a plurality of sleeves 52 which are inserted in each of spacer passages 55 and are capable of being rotated to a desired position, sleeves 52 preferably being of the same length as spacer passages 55 of first spacer plate 50. The inner diameter of sleeves 52 is greater than the outer diameter of tubes 40 so that, when sleeves 52 are inserted in spacer passages 55, an outer annular opening about an inner opening is also formed between sleeves 52 and tubes 40. Preferably, sleeves 52 are also formed of a low coefficient of friction thermoplastic material, such as those suitable for first spacer plate 50, for facilitating the flow of the food component through the annulus.

Figure 8:
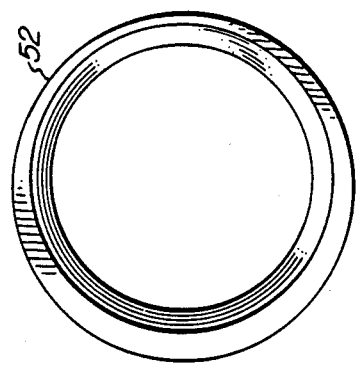
FIG. 8 is a top plan view of the inlet end of another of the sleeves of the present invention.
Figure 8A:
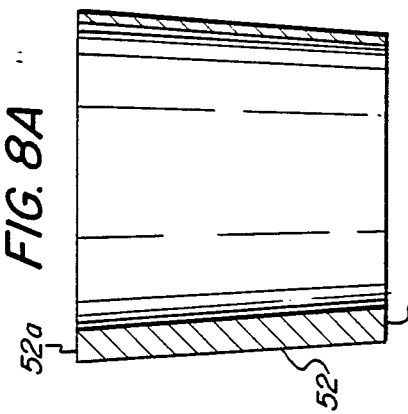
FIG. 8a is a side view in cross section of the sleeve of FIG. 8.
Figure 7:
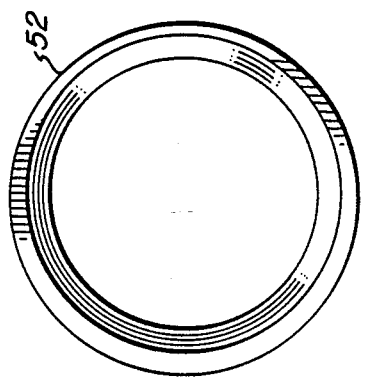
FIG. 7 is a top plan view of the inlet end of another of the sleeves of the present invention.
Figure 7A:
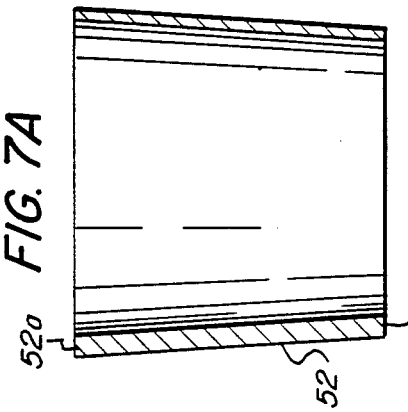
FIG. 7a is a side view in cross section of the sleeve of FIG. 7.
Figure 6:
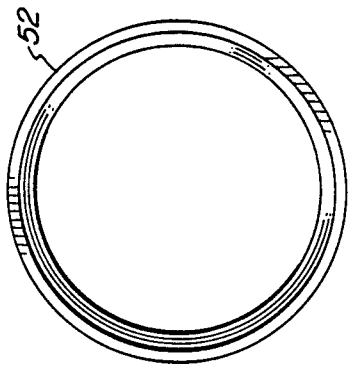
FIG. 6 is a top plan view of the inlet end of one of the sleeves of the present invention.
Figure 6A:
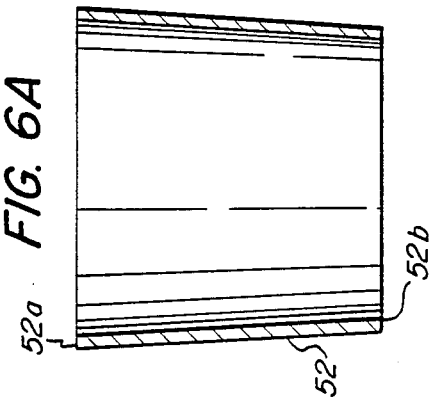
FIG. 6a is a side view in cross section of the sleeve of FIG. 6.

Each of sleeves 52 comprise an annular insert which have an entrance opening at an entrance end 52a and a discharge opening at a discharge end 52b, as illustrated in FIGS. 6a, 7a and 8a. When sleeves 52 are inserted into spacer passages 55, entrance end 52a is located adjacent to distal end 21b of chamber 21 of manifold 20 and discharge end 52b is located at the end of first spacer plate 50 not adjacent to chamber 21 of manifold 20.

As illustrated in FIGS. 6, 6a, 7, 7a, 8 and 8a, sleeves 52 preferably have a decreasing inner diameter from entrance end 52a to discharge end 52b and have circumferentially variable wall thickness. Generally, the inner diameter of sleeves 52 varies from up to about 2.2 inches at entrance end 52a to at least about 1.3 inches at discharge end 52b, although the skilled artisan may use any suitable diameter ranges, as desired. By circumferentially variable wall thickness is meant that the thickness of the wall of the annular insert which forms each of sleeves 52 varies around the circumference of sleeve 52. The wall thickness of each of sleeves 52 can vary from about 0.025 inches at its narrowest point, up to about 0.5 inches or higher at its widest point, depending on what is needed to ensure that outer component 110 is substantially uniformly distributed about inner component 100 of center-filled food product 120, as will be discussed in more detail below.

As described above and illustrated in FIGS. 2 and 10, first extruder 30 extrudes the inner component of the center-filled pet food of this invention through the plurality of tubes 40 which extend through chamber 21 of manifold 20 and into spacer passages 55 of first spacer plate 50. Meanwhile, second extruder 35 extrudes outer component 110 through port 21c into chamber 21 of manifold 20 so that outer component 110 flows around tubes 40. Outer component 110 of food product 120 then flows into the annuli formed by sleeves 52 and tubes 40. Either in spacer passages 55 or coterminus with the discharge end of spacer passages 55, inner component 100, which is being fed through tubes 40, converges with outer component 110, which is being fed through the annuli. As inner component 100 is discharged from the inner circular openings (the discharge ends of tubes 40) and outer component 110 is discharged from the outer annular openings formed by sleeves 52 and tubes 40, a center-filled stream is formed.

Sleeves 52 are inserted in spacer passages 55, as illustrated in FIG. 10, and capable of being rotated, as discussed above. By this is meant that sleeves 52 can be rotated by hand or other means such as a system of gears while inserted in passages 55. It has been found that rotation of sleeves 52 within spacer passages 55 is extremely effective in balancing the flow of outer component 110 about inner component 100, thereby achieving a substantially uniform distribution of outer component 110 about inner component 100 or, if desired, controllably varying the distribution of outer component 110 about inner component 100.

The circumferentially varied wall thickness of sleeves 52 produces an eccentric annuli between sleeves 52 and tubes 40, the annuli having differing widths circumferentially thereabout. By choosing the appropriate sleeves 52 based on its wall thickness and by rotating sleeves 52 inside spacer passages 55, resistance to the flow of outer component 110, especially at or adjacent entrance end 52a of sleeves 52 can be varied. Sleeves 52 can be rotated so that wider annuli openings are in the area of greater flow resistance thereby facilitating flow in those areas, while narrower annuli openings are in the area of lesser flow resistance, thereby inhibiting flow in those areas. This can be used to balance the flow of outer component 110 about tubes 40 and thus achieve desired uniform distribution of outer component 110 about inner component 100 at each tube 40 discharge.

It will be recognized that the flow resistance of outer component 110 in an area adjacent or proximal to port 21c through which outer component 110 enters manifold 20 will be less than that in an area distal to port 21c where outer component 110 will have had to pass by numerous tubes 40 to reach such area. Moreover, the areas surrounding each tube 40 distal to port 21c will also be an area of greater flow resistance than those areas surrounding each tube 40 more proximal to port 21c. The flow balancing (i.e., narrowing of the annular opening) required in such distal areas (of both manifold 20 as a whole and each tube 40 individually) will, therefore, be less than that required in the proximal areas where flow resistance is the least. The wall thickness of sleeves 52 would not need be as great in the distal areas as in the proximal areas. For instance, for tubes located in the proximal area of manifold 20, the proximal area of each such tube 40 may require a sleeve 52 having a maximum wall thickness of about 0.5 inches. For tubes located in the distal area of manifold 20, the proximal area of each tube 40 may require a sleeve 52 having a maximum wall thickness of only about 0.2 inches. Each sleeve 52 can then be rotated such that its maximum wall thickness is in the region of least flow resistance. It will be recognized by the skilled artisan that the actual selection and rotation of sleeves 52 requires a certain amount of experimentation to determine the appropriate wall thickness of sleeve 52 for each annular opening and the degree of rotation of each sleeve 52.

Preferably, as illustrated in FIGS. 1 and 9, multi-orifice coextrusion apparatus 10 further comprises a die plate 60 which is mounted on manifold 20 with first spacer plate 50 disposed between distal end 21b and die plate 60. Die plate 60, as will be familiar to one having skill in the art, comprises a plurality of die passages 65, each of which corresponds to the discharge end of each of the plurality of spacer passages 55. As inner component 100 and outer component 110 of center-filled food product 120 of this invention are discharged from spacer passages 55 as a center-filled stream, the center-filled stream flows through die passages 65. Die passages 65 may each have a specific shape, which is the desired shape for the center-filled product. As the center-filled stream flows through die passages 65, it assumes the shape of die passages 65. For example, if a "porkchop"-shaped food product is desired, die passages 65 can be provided with a "porkchop" shape to impart such shape to center-filled product 120.

Figure 11:
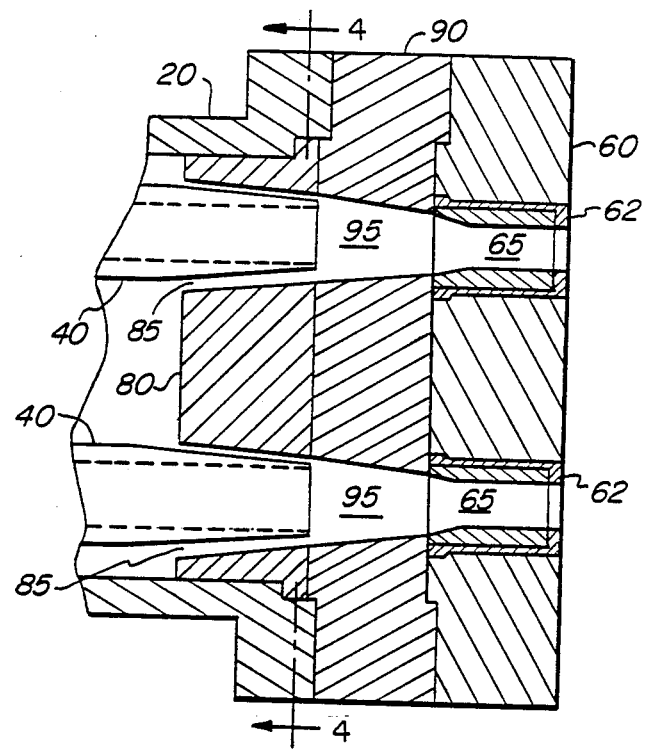
FIG. 11 is a side plan view in cross section of the multi-orifice coextrusion apparatus of the present invention having the second and third spacer plates and the die plate with die inserts present therein.

Preferably, though, die passages 65 are circular or rectangular in shape and have die inserts 62, as illustrated in FIGS. 9, 10 and 11, inserted into them. Die inserts 62 function to provide the desired shape to center-filled stream By use of die inserts 62, die plate 60 need not be made specific for each particular shape desired, but, rather, die inserts 62 can be produced for each particular shape. When a different shape than the one currently being produced is desired, die inserts 62 can then be replaced, thereby eliminating the need for the replacement of die plate 60.

Die plate 60 can be formed of any material having the appropriate characteristics, such as thermal stability and corrosion resistance, and is preferably a metal, such as aluminum or stainless steel. Die plate 60 can also be formed of a thermoplastic material, such as those disclosed as being suitable for first spacer plate 50.

Die inserts 62 are preferably formed of a thermoplastic, low coefficient of friction material such as those described above. Die inserts can also be formed from stainless steel or aluminum and coated with low coefficient of friction materials. It has surprisingly been found that use of die inserts 62, which are a low coefficient of friction material, leads to the production of food product 120 pieces which are uniform in thickness and have substantially flat sides, without a significant amount of puffing, cupping or bowing, as would be expected by the skilled artisan.

Puffing, cupping and bowing are generally experienced when extruding a product, because the walls of the die being used to shape the extrusion stream cause the periphery of the stream to "lag" behind the center of the stream. Upon discharge and slicing of the product, therefore, a puffed, cupped or bowed appearance is created. Such puffing, cupping and bowing is undesirable because it vitiates the visual impression attempted to be conveyed by the product. In other words, if food product 120 is intended to have the appearance of a porkchop, having "puffy" side would at least partially dispel such appearance. Substantially flat sides and uniform thickness, therefore, are highly desired.

The reason die inserts 62 produce pieces having substantially flat sides and little, if any, puffing, bowing or cupping is believed to be that the low coefficient of friction of die inserts 62 allows the periphery of the stream to flow at about the same rate as the center, thereby preventing the "lag" described above. To fully accomplish this, though, it is desired that die inserts 62 be at least about 0.5 inches, preferably about 1.0 inches to about 2.0 inches in length, and be produced of such low coefficient material. Die plate 60, therefore, should be at least about 0.5 inches, preferably about 1.0 inches to about 2.0 inches in thickness.

Die plate 60 preferably further comprises flange 60a, which can be used to secure die 60 to manifold 20, as illustrated in FIGS. 1 and 2. Flange 60a most preferably has holes which correspond to the holes in a complementary flange 20a on manifold 20. Bolts (not shown), or other conventional securing means, can be disposed through the holes in die flange 60a and the corresponding holes in manifold flange 20a to secure die plate 60 to manifold 20. Alternately, a clamping device, such a those commercially available from Wenger Manufacturing Company of Sabetha, Kans. for use in conjunction with a Wenger X-200 extruder, can be used to secure die plate 60 to manifold 20. Preferably, first spacer plate 50 also has a flange or shoulder 50a, which interfits between die flange 60a and manifold flange 20a, thereby mounting first spacer plate 50 between die plate 60 and manifold 20. By mounting first spacer plate 50 in such a fashion, insertion and removal of first spacer plate 50 can be conveniently accomplished by removing the bolts which secure die pl ate 60 to manifold 20 and removing die plate 60.

The size of the food product formed by die plate 60 can be any desired by the skilled artisan. Generally, it has been found that food pieces which have a major dimension (i.e., top of the chop to bottom of the chop) of greater than about 1.5 inches are larger than can be comfortably consumed by smaller pets such as small dogs, while food pieces which have a major dimension less than about 0.3 inches do not convey the visual image desired in a pet food having visually distinct regions. The preferred major dimension of food product 120 of this invention is about 0.3 inches to about 1.5 inches, most preferably about 0.5 inches to about 0.7 inches.

Advantageously, multi-orifice coextrusion apparatus 10 of this invention further comprises a slicing means which functions to slice the center-filled stream as it is discharged from die passages 62 to form center-filled product 120 of this invention. Although the thickness of center-filled product 120 is a matter solely within the discretion of the practitioner and subject to wide variation, it is usually in the range of about 0.05 to about 1.00 inches, preferably about 0.20 to about 0.50 inches.

Typically, a suitable slicing means comprises a rotating knife assembly 70, as illustrated in FIG. 2. Rotating knife assembly 70 will be familiar to the skilled artisan. A typical assembly which ma be used as rotating knife assembly 70 is disclosed by Turk in U.S. Pat. No. 4,240,779, the disclosure of which is incorporated herein by reference. Exemplary of preferred rotating knife assembly is that commercially available from Wenger Manufacturing Company of Sabetha, Kans.

In a preferred embodiment, rotating knife assembly 70 comprises about six to eight knives which are mounted on a hub which in turn is mounted on a shaft 72 disposed at about the center point of die 60 as illustrated in FIG. 2. The knives which comprise rotating knife assembly 70 are preferably relatively long for knives commonly used for this purpose, generally about 1.0 inches to about 6.0 inches in length, most preferably about 4.0 inches to about 5.0 inches long. Moreover, the knives are advantageously relatively thin, i.e., about 0.05 inches to about 0.50 inches, most preferably about 0.10 inches to about 0.20 inches wide. In this way, a small angle of cutting is provided, which has been found to be especially effective at aiding in preventing undesirable crowning, cupping or bending of the sliced pieces of food product 120.

Advantageously, rotating knife assembly 70 functions to slice center-filled product 120 into pieces which are about 0.05 to about 1.00 inches thick. Preferably, the thickness of the sliced pieces of food product 120 produced by rotating knife assembly 70 is about 0.20 inches to about 0.30 inches.

Moreover, because rotating knife assembly 70 can be rotating at high speed (i.e., about 500 revolutions per minute), which tends to cause sliced food product 120 to fly in many directions, multi-orifice coextrusion apparatus 10 also advantageously comprises a hood or cage-type element (not shown) sometimes referred to as a shroud which acts to prevent product 120 which is sliced from the center-filled stream at such a high rate from being thrown in undesirable directions by the action of rotating knife assembly 70. A suitable hood or cage, the structure of which is conventional and well known to those having skill in the art, serves to direct the "flying" pieces of center-filled product 120 back down onto the conveyor or other means which is used to collect and remove food product 120 after discharge and slicing.

In a preferred embodiment of the present invention, multi-orifice coextrusion apparatus 10 further comprises a second spacer plate 80 as illustrated in FIG. 11, which can be formed of any of the materials which can be used to form first spacer plate 50, preferably the disclosed low coefficient of friction thermoplastic materials. Second spacer plate 80 comprises a plurality of second spacer passages 85 which correspond to spacer passages 55 of first spacer plate 50 with sleeves 52 therein. Second spacer passages 85 are configured to substantially promote the uniform distribution of outer component 110 about inner component 100 in the same manner as first spacer plate 50 when sleeves 52 are selected and rotated as described above.

In fact, second spacer plate 80 can be prepared so that the inner diameter and configuration of second spacer passages 85 duplicate the inner diameter and configuration of sleeves 52, after sleeves 52 are selected and rotated in spacer passages 55 to provide substantially uniform flow distribution of outer component 110 about inner component 100, as illustrated in FIG. 11. In this way, uniform distribution of 110 outer component about inner component 100 is achieved utilizing a one-piece spacer plate instead of a spacer plate which requires the presence of sleeves.

Second spacer plate 80 preferably also has shoulder 80a similar to shoulder 50a of first spacer plate 50, as illustrated in FIG. 11. In this way, second spacer plate 80 can be inserted and removed in the same manner as first spacer plate 50.

Most preferably, after sleeves 52 are selected and rotated to achieve substantially uniform flow distribution of outer component 110 about inner component 100 as desired, first spacer plate 50, with sleeves 52 still present therein, is removed from manifold 20 (such as by first removing die plate 60, as discussed above). First spacer plate 50 is then replaced with second spacer plate 80, which has been milled, machined or otherwise formed so that the inner diameter and configuration of second spacer passages 85 conforms to the post-rotational inner diameter and configuration of sleeves 52 to assure that second spacer plate 80 provides a substantially uniform distribution of outer component 110 about inner component 100 of the center-filled stream which is discharged from second spacer plate 80, through die passages 62, sliced by rotating knife assembly 70 to form center-filled product 120 of the present invention.

Multi-orifice coextrusion apparatus 10 of the present invention preferably further comprises a third spacer plate 90, having tapering third spacer passages 95 having a discharge end and an entrance end, the entrance end of third spacer passages 95 corresponding to the discharge end of spacer passages 55 or, when second spacer plate 80 is used to replace first spacer plate 50, second spacer passages 85. Advantageously, therefore, third spacer plate 90 is mounted between first or second spacer plates 50 or 80, whichever is currently in use, and die plate 60, when die plate 60 is used, as illustrated in FIGS. 1, 2, 5, 9 and 10.

Third spacer plate 90 is used to stabilize and streamline (to create a more smooth and easy flow) the flow of the center-filled stream by tapering the stream after it is discharged from either spacer passages 55 or second spacer passages 85, and to facilitate the adherence of the two components together as will be easily recognized by the skilled practitioner. Typically, third spacer plate 90 has a length of about 1 inch to about 4 inches to provide the time for such component adherence.

Advantageously, third spacer plate 90 is provided with a flange 90a surrounding third spacer plate 90. Flange 90a can be used to bolt or clamp third spacer plate 90 to manifold 20 by conventional bolts or clamps (not shown) or other like connecting means and is most preferably disposed between die flange 60a and manifold flange 20a, with first or second spacer plate shoulder, 50a or 80a, interfitted therebetween, as illustrated in FIG. 9.

Third spacer plate 90 is formed of any material which is disclosed as suitable for formation of first spacer plate 50. Preferably, third spacer plate 90 is formed of stainless steel having a low coefficient of friction material, such as those discussed above, or titanium nitride or chromium, coated or plated thereon.

Third spacer plate 90 may also have associated therewith a plurality of secondary sleeves 92 formed of a low coefficient of friction material which are inserted in third spacer passages 95. Secondary sleeves 92 can be used to provide specific degrees of tapering to third spacer passages 95, and thereby control the stabilization of the flow of the center-filled stream.

As illustrated in FIG. 12, advantageously, after the center-filled stream is discharged from die plate 60 and sliced into center-filled food product 120 of the present invention, it is collected on a suitable device, preferably a conveyor 160. Preferably, conveyor 160 is a high speed conveyor—high speed to avoid hot and sticky product pieces from piling on top of each other and clumping. The product is then conveyed further to preferably be dried and/or cooled in suitable, conventional apparatus represented by dryer/cooler 130. Exemplary apparatus include a Wenger brand cooler, a Wenger brand Model 1200, Series II dryer-cooler and an Aeroglide brand dryer-cooler, all commercially available. Preferably, food product 120 of this invention is dried to an overall moisture content of about 10% to about 35%, most preferably about 13% to about 25% and cooled to a temperature of below about 130° F., most preferably below about 100° F.

The dried and/or cooled pieces can then by enrobed with a palatability enhancing material such as tallow or other fats, enzymatically treated meat/poultry/fish products, meat meal, alone or with fat, meat flavors like hydrolyzed vegetable proteins, natural and artificial flavors and the like, as known to the skilled artisan. Conventional equipment can be used to enrobe the pieces, such as an enrober 140, illustrated in FIG. 12, which consists of a horizontal rotating drum into which the enrobing material is sprayed by spray nozzles. The tumbling in the enrober causes the pieces of food product 120 to be uniformly coated with the enrobing material.

The thusly prepared pieces of food product 120 are advantageously found to have a bulk density of about 15.0 to about 45.0 pounds per cubic feet (lbs/ft$^3$), most preferably about 25.0 to about 35.0 lbs/ft$^3$. The bulk density can be determined by filling a 0.25 cubic foot container with the pieces of food product 120, determining the weight of the pieces, and dividing the weight in pounds by the volume in cubic feet. The bulk density is most important in terms of packaging of food product 120.

The pieces of food product are then stored for later treatment or packaging, or packaged by conventional packaging apparatus, such as packaging apparatus 140, illustrated in FIG. 12.

The following example further illustrates and explains the invention by detailing the preparation of a center-filled pet food using the apparatus and method of this invention.

EXAMPLE I

To the introduction hopper of a Wenger model X-200 extruder is added, at the rate of about 15,000 lbs/hr., a blend of the following ingredients:

| Ingredient | Weight (percent) |
|---|---|
| soybean flour | 28.0 |
| ground whole wheat | 16.0 |
| corn syrup | 10.0 |
| oatmeal | 7.5 |
| animal fat | 6.0 |
| propylene glycol | 5.5 |
| beef and bone meal | 4.0 |
| vitamins, minerals, salt, colors and preservatives | 3.0 |
| water (for processing) | 20.0 |
| | 100.0 |

The ingredients are mixed under pressure in the extruder and brought to a temperature of about 240° F. to form a first extruded material, then extruded through eighteen tubes into a coextrusion manifold.

Simultaneously, into the introduction hopper of a Wenger model X-175 extruder, at a delivery rate of about 8000 lbs/hr., are added a blend of the following ingredients:

| Ingredient | Weight (percent) |
|---|---|
| ground whole wheat | 37.0 |
| soybean flour | 18.0 |
| oatmeal | 8.0 |
| bone phosphate | 6.0 |
| animal fat | 5.0 |
| phosphoric acid | 1.0 |
| vitains, minerals, salt, colors and preservatives | 1.0 |
| water (for processing) | 24.0 |
| | 100.0 |

The ingredients are mixed under pressure in the extruder and brought to a temperature of about 240° F. to form a second extruded material, then extruded through piping into the coextrusion manifold, entering the manifold from the side and surrounding the tubes through which flow the first extruded material.

The tubes through which flow the first extruded material extend into the spacer passages of a first spacer plate mounted at the end of the coextrusion manifold, thereby forming annuli between the tubes and the inner diameter of the spacer passages. As the first extruded material flows through the tubes, the second extruded material flows through the thusly-formed annuli. Each of the spacer passages has mounted therein a sleeve which can be rotated therein.

The tubes through which flow the first extruded material terminate at the discharge end of the spacer passages, causing a convergence of the flow of the first extruded material with the flow of the second extruded material to form eighteen center-filled streams. After discharging from the first spacer plate, the streams then flow through a third spacer plate mounted on the manifold adjacent to the first spacer plate which serves to stabilize and streamline the streams and provide time for the inner and outer components to adhere to each other. After being discharged from the third spacer plate, the streams flow through a die plate having die inserts, the die plate with die inserts being mounted on the manifold adjacent to the third spacer plate, which form the center-filled streams into a "porkchop" shape having a major dimension of about 0.6 inches. The "porkchop" shaped streams are then sliced into pieces by a Wenger brand cutter to obtain the desired thickness.

The flow of the center-filled streams out of the die plate are observed with a strobe light and non-uniform distribution of any of the streams is noted. The cutter, die plate and third spacer plate are then removed from the manifold and the sleeves are then replaced with sleeves of different wall thicknesses and/or rotated to minimize the non-uniform distribution of the streams. This process is repeated until substantially uniform distribution of the second extruded material about the first extruded material is achieved.

The first spacer plate and sleeves are then removed and a second spacer plate is formed by machining the spacer passages of the second spacer plate to have an inner diameter and configuration which is equivalent to the inner diameter and configuration of the first spacer plate having the rotated sleeves therein.

The second spacer plate is then mounted on the manifold in place of the first spacer plate and the third spacer plate and die plate are mounted thereon and the extrusion of the first and second extruded materials continued.

As the center-filled stream is discharged from the die passages, it is sliced into relatively flat pieces having a thickness of about 0.25 inches using a rotating knife assembly. The pieces are conveyed to stations where they are cooled and dried and enrobed with a fat. The thusly-formed pieces are measured to have a bulk density of about 30.0 lbs/ft$^3$ and are then packaged and held in storage.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:
1. A multi-orifice coextrusion apparatus comprising:
   (i) a first extruder positioned to feed a first extruded material into a manifold through a plurality of tubes;

(ii) a plurality of tubes extending from said first extruder through which said first extruder can feed the first extruded material into a manifold;

(iii) a second extruder positioned to feed a second extruded material into a manifold so as to flow around said plurality of tubes;

(iv) a manifold, which comprises a chamber into which said plurality of tubes extend and having a port for introduction of the second extruded material from said second extruder, wherein said chamber comprises a substantially open area to permit the second extruded material to flow around said plurality of tubes;

(v) a spacer plate mounted on said manifold which comprises a plurality of spacer passages each of which corresponds to each of said plurality of tubes, each of said spacer passages having an inner diameter greater than the outer diameter of each of said plurality of tubes, and each of said plurality of tubes being disposed in one of said plurality of spacer passages wherein an outer annular opening about an inner opening is formed by each spacer passage/tube combination, wherein said outer annular openings and said inner openings converge to form a plurality of extrusion orifices and said outer annular openings are configured to maintain substantially uniform distribution of the second extruded material about the first extruded material and substantially constant volumetric flow across the cross section of each of said extrusion orifices, said spacer passages each having a rotatable sleeve circumferentially variable in wall thickness.

2. A multi-orifice coextrusion apparatus comprising:

(i) a first extruder positioned to feed a first extruded material into a manifold through a plurality of tubes;

(ii) a plurality of tubes extending from said first extruder through which said first extruder can feed the first extruded material into a manifold;

(iii) a second extruder positioned to feed a second extruded material into a manifold so as to flow around said plurality of tubes;

(iv) a manifold, which comprises a chamber into which said plurality of tubes extend and having a port for introduction of the second extruded material from said second extruder, wherein said chamber comprises a substantially open area to permit the second extruded material to flow around said plurality of tubes;

(v) a first spacer plate mounted on said manifold which comprises a plurality of spacer passages each of which corresponds to each of said plurality of tubes, each of said spacer passages having an inner diameter greater than the outer diameter of each of said plurality of tubes, and each of said plurality of tubes being disposed in one of said plurality of spacer passages wherein an outer annular opening about an inner opening is formed by each spacer passage/tube combination, wherein said outer annular openings and said inner openings converge to form a plurality of extrusion orifices; and (vi) rotatable insert means having circumferentially variable wall thickness for configuring said outer annular openings to maintain substantially uniform distribution of the second extruded material about the first extruded material and substantially constant volumetric flow across the cross section of each of said extrusion orifices.

3. The apparatus of claim 2 wherein said insert means comprise a plurality of sleeves having an inner diameter greater than the outer diameter of said tubes, each of said sleeves being inserted into each of said plurality of spacer passages of said first spacer plate about said tubes so as to be rotatable therein, wherein each of said sleeves comprises an annular insert having an entrance opening at an entrance end thereof and a discharge opening at a discharge end thereof, said sleeves having circumferentially variable wall thickness and rotatable to maintain substantially uniform distribution of the second extruded material bout the first extruded material.

4. The apparatus of claim 2 which further comprises a die plate mounted on said manifold comprising a plurality of passages each of which corresponds to the discharge end of each of said spacer passages of said first spacer plate.

5. The apparatus of claim 4 wherein said die plate further comprises die inserts which are inserted into each of said die plate passages and which are made of a material having a coefficient of friction lower than that of stainless steel.

6. The apparatus of claim 3 wherein said sleeves are formed of a material having a coefficient of friction lower than that of stainless steel.

7. The apparatus of claim 3 which further comprises a third spacer plate mounted on said manifold and disposed between said first spacer plate and said die plate, said third spacer plate having a plurality of passages each of which has an entrance end and a discharge end, the entrance end of each passage corresponding to the discharge end of each of said sleeves.

8. The apparatus of claim 3 wherein the circumferential thickness of the walls of said sleeves varies from about 0.025 to about 0.50 inches.

9. The apparatus of claim 8 wherein the circumferential thickness of the walls of said sleeves varies from about 0.03 inches to about 0.2 inches.

10. The apparatus of claim 5 which further comprises a slicing means mounted adjacent the discharge end of said die plate, said slicing means functioning to slice portions of extruded material as it is discharged from said die plate.

11. The apparatus of claim 10 wherein said slicing means comprises a rotating knife assembly.

12. The apparatus of claim 11 wherein said rotating knife assembly comprises about six to eight knives, each of which is about 1.0 inches to about 6.0 inches in length and about 0.05 inches to about 0.50 inches in width.

13. The apparatus of claim 12 wherein said knives are each about 4.0 to about 5.0 inches in length.

14. A multi-orifice coextrusion apparatus comprising:

(i) a first extruder positioned to feed a first extruded material into a manifold through a plurality of tubes;

(ii) a plurality of tubes extending from said first extruder through which said first extruder can feed the first extruded material into a manifold;

(iii) a second extruder positioned to feed a second extruded material into a manifold so as to flow around said plurality of tubes;

(iv) a manifold, which comprises a chamber into which said plurality of tubes extend and having a port for introduction of the second extruded material from said second extruder, wherein said chamber comprises a substantially open area to permit the second extruded material to flow around said plurality of tubes;

(v) a spacer plate on said manifold which comprises a plurality of spacer passages each of which corresponds to each of said plurality of tubes, each of said spacer passages having an inner diameter greater than the outer diameter of each of said plurality of tubes, and each of said plurality of tubes being disposed in one of said plurality of spacer passages wherein an eccentric outer annular opening about an inner opening is formed by each spacer passage/tube combination, wherein said eccentric outer annular openings and said inner openings converge to form a plurality of extrusion orifices configured to maintain substantially uniform distribution of the second extruded material about the first extruded material and substantially constant volumetric flow across the cross section of each of said extrusion orifices.

15. The apparatus of claim 14 which further comprises a die plate mounted on said manifold comprising a plurality of passages each of which corresponds to the discharge end of each of said spacer passages of said spacer plate.

16. The apparatus of claim 15 wherein said die plate further comprises die inserts which are inserted into each of said die plate passages and which are made of a material having a coefficient of friction lower than that of stainless steel.

17. The apparatus of claim 16 which further comprises a slicing means mounted adjacent the discharge end of said die plate, said slicing means functioning to slice portions of extruded material as it is discharged from said die plate.

18. The apparatus of claim 17 wherein said slicing means comprises a rotating knife assembly.

19. The apparatus of claim 18 wherein said rotating knife assembly comprises about six to eight knives, each of which is about 1.0 inches to about 6.0 inches in length and about 0.05 inches to about 0.50 inches in width.

20. The apparatus of claim 19 wherein said knives are each about 4.0 to about 5.0 inches in length.

* * * * *